(12) United States Patent
Repasi et al.

(10) Patent No.: US 8,640,235 B2
(45) Date of Patent: Jan. 28, 2014

(54) DETERMINATION OF MALICIOUS ENTITIES

(75) Inventors: Rolf Repasi, Sunrise Beach (AU); Simon Clausen, New South Wales (AU)

(73) Assignee: Symantec Corporation, Mountain View, CA (US)

( * ) Notice: Subject to any disclaimer, the term of this patent is extended or adjusted under 35 U.S.C. 154(b) by 1793 days.

(21) Appl. No.: 11/731,324

(22) Filed: Mar. 30, 2007

(65) Prior Publication Data

US 2009/0328212 A1    Dec. 31, 2009

Related U.S. Application Data

(60) Provisional application No. 60/788,853, filed on Apr. 3, 2006.

(30) Foreign Application Priority Data

Mar. 31, 2006    (AU) ................................ 2006901665

(51) Int. Cl.
 *H04L 29/06*    (2006.01)
(52) U.S. Cl.
 USPC .............................................. 726/23; 726/25
(58) Field of Classification Search
 USPC ......................................... 726/22, 23, 24, 25
 See application file for complete search history.

(56) References Cited

U.S. PATENT DOCUMENTS

| | | | | |
|---|---|---|---|---|
| 5,398,196 A * | 3/1995 | Chambers | ...................... | 714/28 |
| 5,440,723 A * | 8/1995 | Arnold et al. | ...................... | 714/2 |
| 5,826,013 A * | 10/1998 | Nachenberg | ...................... | 726/22 |
| 5,842,002 A * | 11/1998 | Schnurer et al. | ................. | 703/21 |
| 5,978,917 A * | 11/1999 | Chi | ................................. | 726/22 |
| 6,981,279 B1 * | 12/2005 | Arnold et al. | ................... | 726/22 |
| 7,085,934 B1 * | 8/2006 | Edwards | ......................... | 726/24 |
| 7,203,960 B1 * | 4/2007 | Painter | ............................ | 726/22 |
| 7,234,167 B2 * | 6/2007 | Teblyashkin et al. | ........... | 726/24 |
| 7,334,263 B2 * | 2/2008 | Szor | ................................. | 726/22 |
| 7,360,249 B1 * | 4/2008 | Szor et al. | ....................... | 726/22 |
| 7,409,717 B1 * | 8/2008 | Szor | ................................. | 726/24 |
| 7,478,431 B1 * | 1/2009 | Nachenberg | .................... | 726/24 |
| 7,565,697 B2 * | 7/2009 | LeVine et al. | ................... | 726/26 |
| 7,607,171 B1 * | 10/2009 | Marsden et al. | ................ | 726/24 |
| 2004/0019832 A1 * | 1/2004 | Arnold et al. | ................... | 714/38 |
| 2008/0320548 A1 * | 12/2008 | Tripathi et al. | .................... | 726/1 |

OTHER PUBLICATIONS

PC Tools, Spyware Doctor Features, Mar. 31, 2005, accessed at archive.org.*
McAfee Security, Product Guide, Issued Feb. 2003, VirusScan® Enterprise software version 7.0.

* cited by examiner

*Primary Examiner* — David García Cervetti
(74) *Attorney, Agent, or Firm* — Holland & Hart LLP

(57) ABSTRACT

A method/system of determining if one or more entities in a data storage medium of a processing system are malicious, wherein the method comprises recording entity properties of the one or more entities when at least part of the processing system is in a range of operating usage; and determining, using the entity properties, if the one or more entities are malicious.

12 Claims, 5 Drawing Sheets

DETERMINATION OF MALICIOUS ENTITIES

CROSS-REFERENCE TO RELATED APPLICATIONS

This application claims the benefit of priority from U.S. Provisional Application No. 60/788,853 filed Apr. 3, 2006, entitled Determination of Malicious Entities, which is incorporated by reference. This application also claims the benefit of priority from application AU 2006901665, filed Mar. 31, 2006, entitled Determination of Malicious Entities.

TECHNICAL FIELD

The present invention generally relates to a method, system and/or computer. readable medium of instructions for determining one or more malicious entities in one or more processing system.

BACKGROUND ART

As used herein a "threat" includes malicious software, also known as "malware" or "pestware", which comprises software that is included or inserted in a part of a processing system or processing systems for a harmful purpose. The term threat should be read to comprise possible, potential and actual threats. Types of malware can comprise, but are not limited to, malicious libraries, viruses, worms, Trojans, adware, malicious active content and denial of service attacks. In the case of invasion of privacy for the purposes of fraud or theft of identity, malicious software that passively observes the use of a computer is known as "spyware".

In a networked information or data communications system, a user has access to one or more terminals which are capable of requesting and/or receiving information or data from local or remote information sources. In such a communications system, a terminal may be a type of processing system, computer or computerised device, personal computer (PC), mobile, cellular or satellite telephone, mobile data terminal, portable computer, Personal Digital Assistant (PDA), pager, thin client, or any other similar type of digital electronic device. The capability of such a terminal to request and/or receive information or data can be provided by software, hardware and/or firmware. A terminal may comprise or be associated with other devices, for example a local data storage device such as a hard disk drive or solid state drive.

An information source can comprise a server, or any type of terminal, that may be associated with one or more storage devices that are able to store information or data, for example in one or more databases residing on a storage device. The exchange of information (ie. the request and/or receipt of information or data) between a terminal and an information source, or other terminal(s), is facilitated by a communication means. The communication means can be realised by physical cables, for example a metallic cable such as a telephone line, semi-conducting cables, electromagnetic signals, for example radio-frequency signals or infra-red signals, optical fibre cables, satellite links or any other such medium or combination thereof connected to a network infrastructure.

An entity can include, but is not limited to, a file, an object, a class, a collection of grouped data, a library, a variable, a process, and/or a device.

As available storage on processing systems increases, it is becoming time consuming to detect and remove malware using current methods of scanning. The scan process utilises a large amount of processing system resources. As a result, if a user is attempting to use the processing system at a time when the scanner is performing a scan, the user can be hindered by the lack of processing system resources available for such processing.

Therefore, there exists a need for a method, system and/or computer readable medium of instructions to determine or identify malware in a processing system which addresses or at least ameliorates problems inherent in the prior art.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

DISCLOSURE OF INVENTION

In one broad form, the present invention provides a method of determining if one or more entities in a data storage medium of a processing system are malicious, wherein the method comprises:
determining entity properties of the one or more entities when at least part of the processing system is in a range of operating usage;
recording the entity properties; and
determining, using the entity properties, if the one or more entities are malicious.

Preferably, but not necessarily, the range of operating usage is at least one of:
processing usage; and,
memory usage.

Also preferably, but not necessarily, the range of operating usage is one of:
selectable; and
predetermined.

Also preferably, but not necessarily, the method comprises determining the entity properties until a pause condition is satisfied.

In particular, but non-limiting, forms, the method comprises pausing the determination of entity properties at a location in the data storage medium when the pause condition is satisfied.

In another particular, but non-limiting, form, the method comprises restarting the determination of entity properties at the location in the data storage medium when a restart condition is satisfied.

In accordance with a specific optional embodiment, the method comprises restarting the determination of whether one or more entities are malicious when the restart condition is satisfied.

Optionally, the pause condition is satisfied when the processing system exits the range of operating usage.

According to one embodiment, the restart condition is satisfied when the processing system re-enters the range of operating usage.

According to another embodiment, the step of determining if one or more entities are malicious is performed whilst the processing system is in the range of operating usage.

According to another non-limiting embodiment, the entity properties comprises at least one of:
(i) entity location in processing system;
(ii) entity size;
(iii) entity type;
(iv) cryptographic hashes of at least some of an entity;
(v) checksums of at least some of an entity;
(vi) plaintext of at least a portion of an entity;

(vii) ciphertext of at least a portion of an entity;
(viii) timestamps of when an entity was created or modified; and
(ix) network location where the entity was obtained.

In one non-limiting form, the method comprises quarantining the one or more entities which are determined to be malicious.

In one optional form, the step of quarantining the one or more entities which are determined to be malicious comprises at least one of:

removing, from the data storage medium, the one or more entities which have been determined as malicious; and modifying, in the data storage medium, the one or more entities which have been determined as malicious.

In another optional form, the step of determining entity properties of the one or more entities is performed when the processing system is in an idle state.

In a further optional form, after the step of determining entity properties of the one or more entities, the method comprises storing the one or more entity properties.

In another optional embodiment, the method comprises:

using a set of suspicious assessment rules and the recorded entity properties to determine if one or more suspicious entities exist in the data storage medium; and if one or more suspicious entities are identified, determining if one or more suspicious entities are malicious.

In a second broad form, the present invention provides a system for determining if one or more entities in a data storage medium of a processing system are malicious, wherein the system is configured to:

determine entity properties of the one or more entities when at least part of the processing system is in a range of operating usage;

record the entity properties; and determine, using the entity properties, if the one or more entities are malicious.

In a third broad form, the present invention provides computer program for determining if one or more entities in a data storage medium of a processing system are malicious, wherein the computer program is adapted to:

determine entity properties of the one or more entities when at least part of the processing system is in a range of operating usage;

record the entity properties; and determine, using the entity properties, if one or more entities are malicious.

BRIEF DESCRIPTION OF FIGURES

An example embodiment of the present invention should become apparent from the following description, which is given by way of example only, of a preferred but non-limiting embodiment, described in connection with the accompanying figures.

MODES FOR CARRYING OUT THE INVENTION

The following modes, given by way of example only, are described in order to provide a more precise understanding of the subject matter of a preferred embodiment or embodiments.

Figure 1:
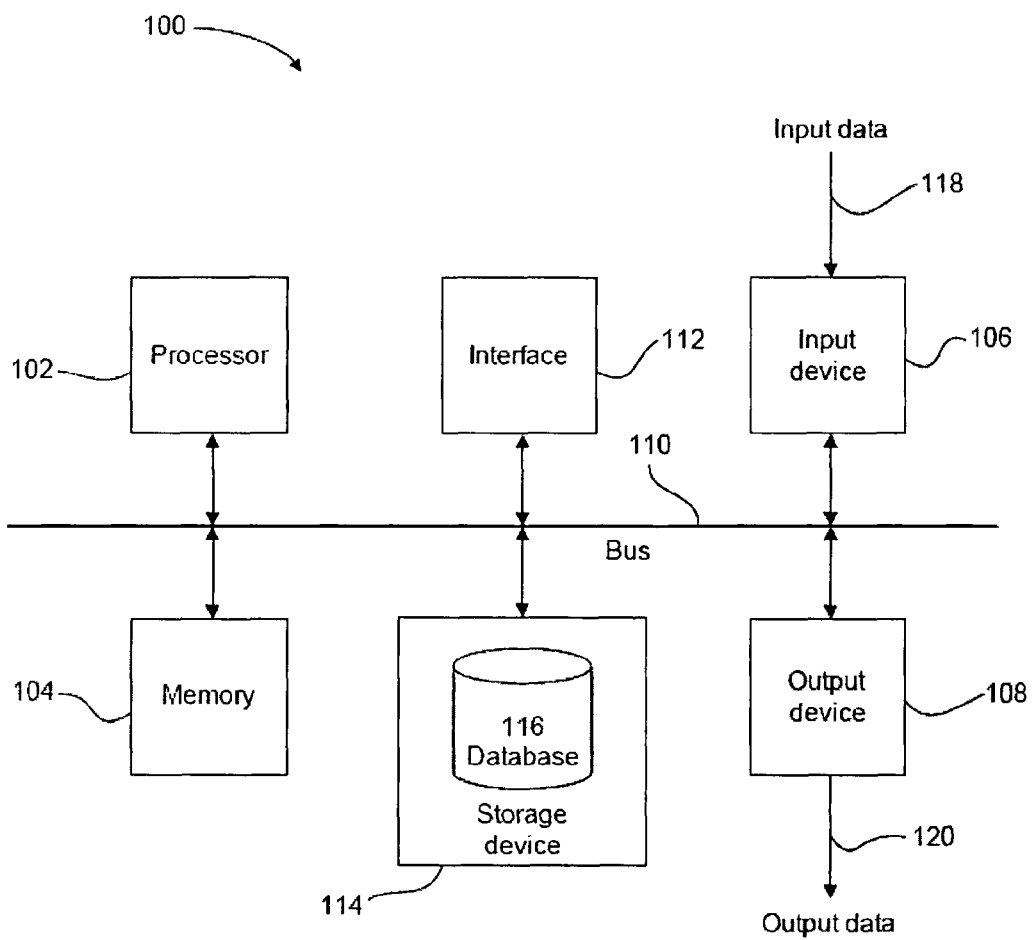
FIG. 1 illustrates a functional block diagram of an example processing system that can be utilised to embody or give effect to a particular embodiment.

A particular embodiment of the present invention can be realised using a processing system, an example of which is shown in FIG. 1. In particular, the processing system 100 generally comprises at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could comprise more than one distinct processing device, for example to handle different functions within the processing system 100. Input device 106 receives input data 118 and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, the at least one database 116. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing system 100 may be any form of terminal, server, specialised hardware, or the like.

The processing system 100 may be a part of a networked communications system. Processing system 100 could connect to network, for example the Internet or a WAN. Input data 118 and output data 120 could be communicated to other devices via the network. The transfer of information and/or data over the network can be achieved using wired communications means or wireless communications means. A server can facilitate the transfer of data between the network and one or more databases. A server and one or more databases provide an example of an information source. In one particular form, the server may transfer, to the processing system 100, data indicative of a computer program which when executed in the processing system 100 performs the method described herein. In other forms, the server may transfer, to the processing system 100, data indicative of one or more rules (or sets of rules) used to determine whether one or more entities are malicious using one or more entity properties.

Figure 2:
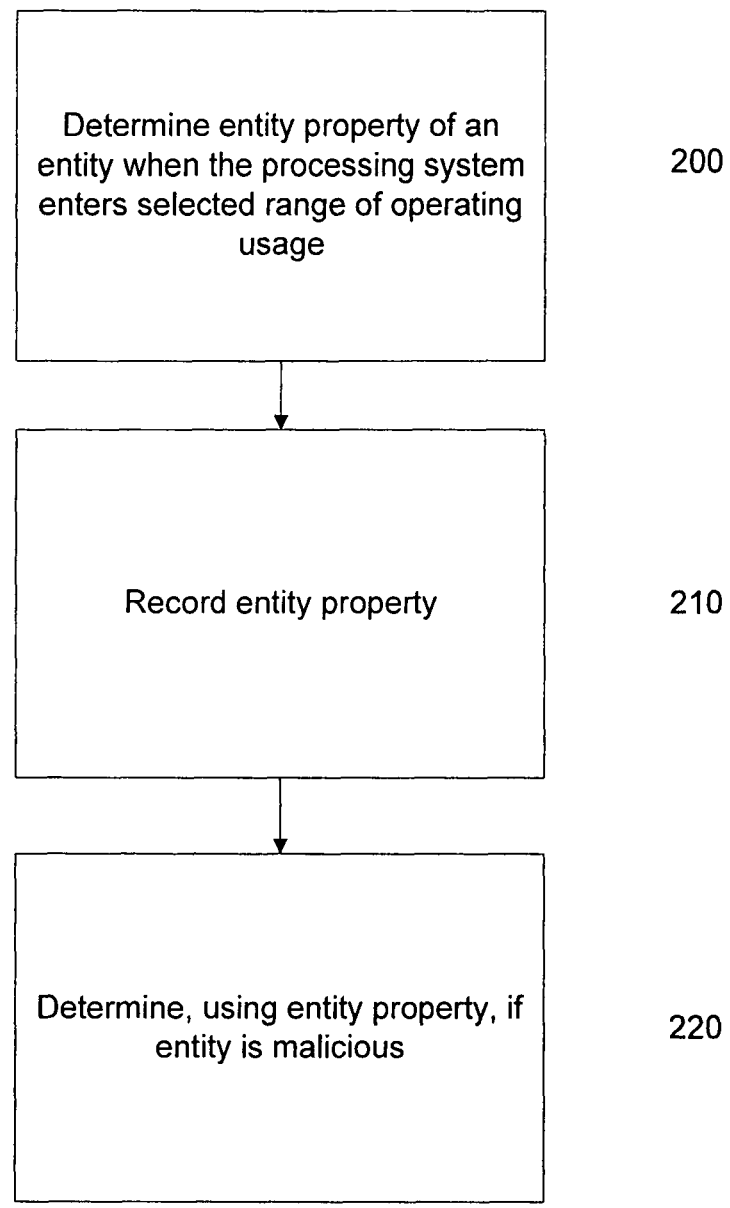
FIG. 2 illustrates a flow diagram of an example method of determining one or more malicious entities.

Referring now to FIG. 2, there is illustrated flow chart showing an example method of determining if one or more entities in a data storage medium of a processing system are malicious.

In particular, at step 200 the method comprises determining entity properties of the one or more entities when at least part of the processing system is in a range of operating usage. At step 210, the method comprises recording the entity properties. At step 220, the method includes determining, using the entity properties, if one or more entities are malicious.

By determining the entity properties of the entities when the processing system is in the range of operating usage, the processing system can be more effectively used during periods or low processor or memory usage. For example, if ten percent of the maximum processing capacity is being used at a particular time, this potential processing capacity can be utilised to determine entity properties of the entities in one or more processing systems whilst not hampering the use of the processing system by the user.

Figure 3:
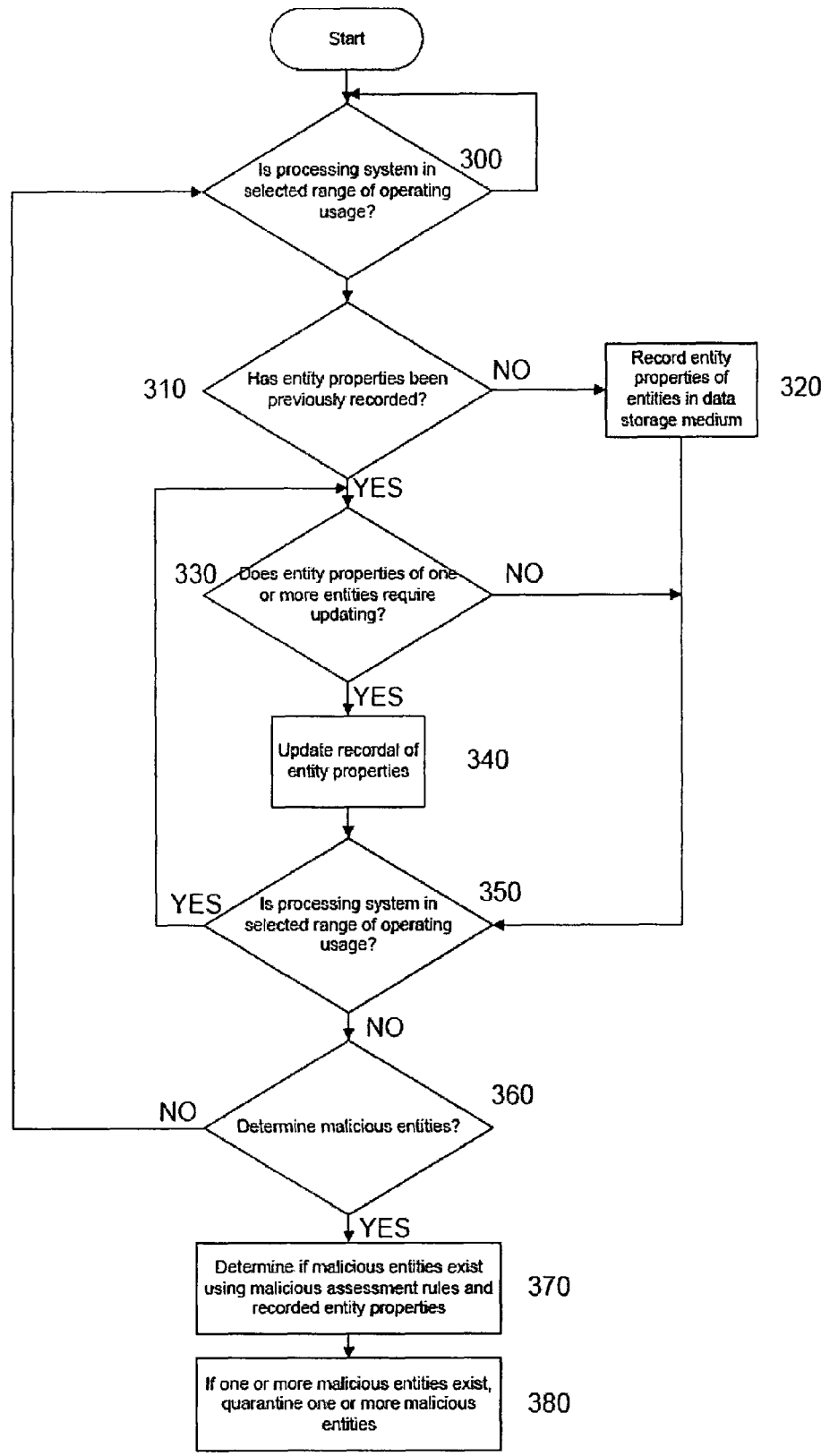
FIG. 3 illustrates a further example of the method illustrated in FIG. 2.

A more detailed example of a method illustrated in FIG. 2 will now be described with reference to FIG. 3.

In particular, at step 300, the method comprises determining if the processing system is in the range of operating usage. In response to a negative determination, the method comprises continuing to monitor the operating usage of the processing system. In response to a positive determination, the method continues to step 310.

At step 310, the method comprises determining if entity properties for entities had been previously recorded. In response to a positive determination, the method continues to step 330. In response to a negative determination, the method continues to step 320.

At step 320, the method comprises recording entity properties of the entities in the data storage medium of the processing system. Generally, the entity properties of each entity are stored in a database. The database can be a local database stored at the processing system. In an alternative form, the database may be stored remotely, such as a server processing system database. In another alternate form, the database may comprise portions located locally and remotely. Once the entity properties have been recorded, the method continues to step 350.

At step 330, the method comprises determining if one or more properties of one or more entities in the processing system require updating. In response to a negative determination, the method continues to step 350. In response to a positive determination, the method continues to step 340.

At step 340, the method comprises updating the recordal of the entity properties for those entities which were determined in step 330. The recordal is generally updated in the database.

At step 350, the method comprises determining if the processing system is in the range of operating usage. In response to a positive determination, the method returns back to step 330. In response to a negative determination, the method continues to step 360.

At step 360, the method comprises determining if a determination of any malicious entities is to be performed. In response to a negative determination, the method returns to step 300. In response to a positive determination, the method continues to step 370.

At step 370, the method comprises determining, using one or more malicious assessment rules and the recorded entity properties, if one or more malicious entities exist in the processing system.

At step 380, if one or more malicious entities exist in the processing system, the method comprises quarantining the one or more malicious entities.

Figure 4A:
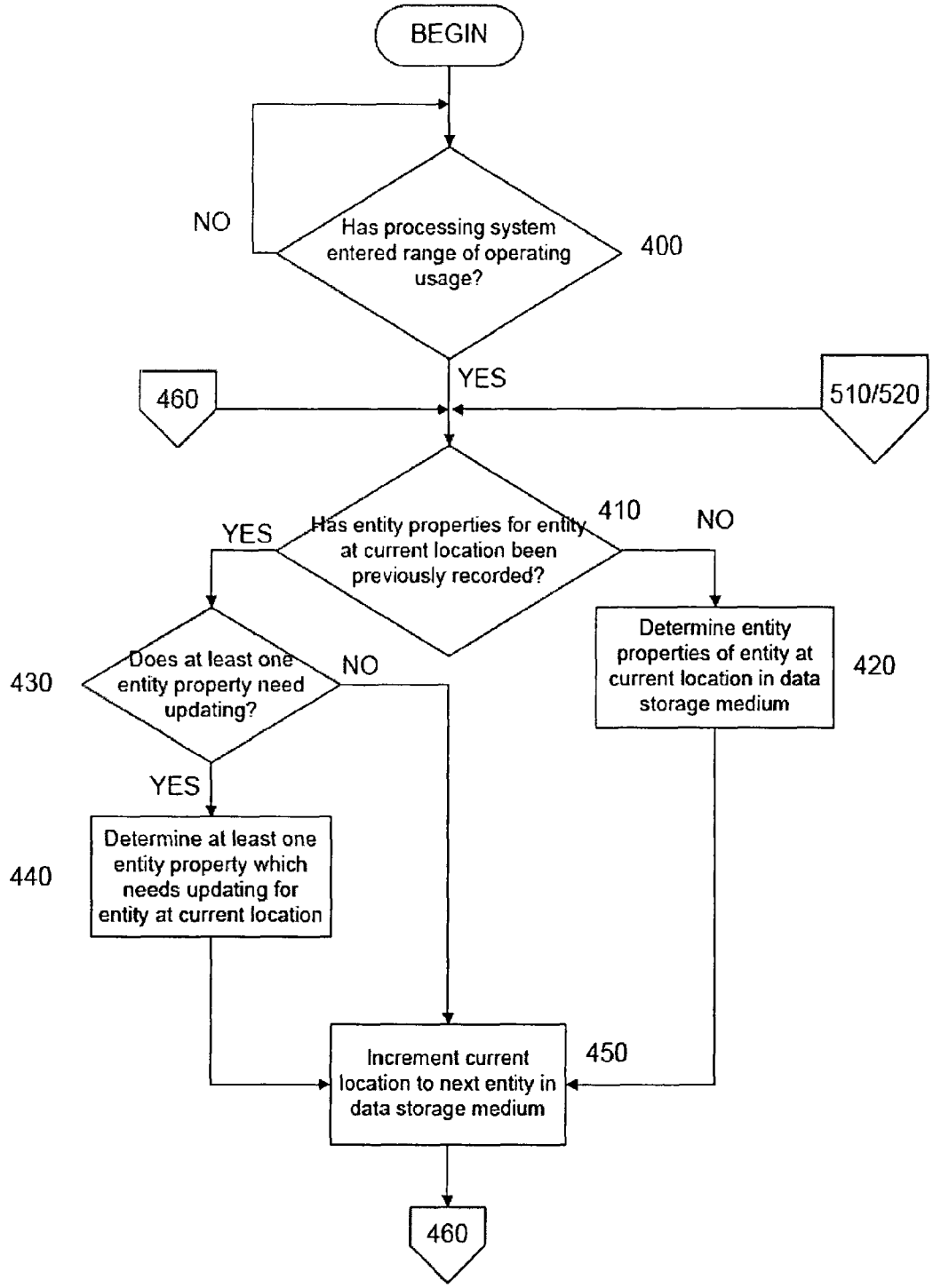
FIGS. 4A and 4B illustrate a further example method illustrated in FIG. 2.
Figure 4B:
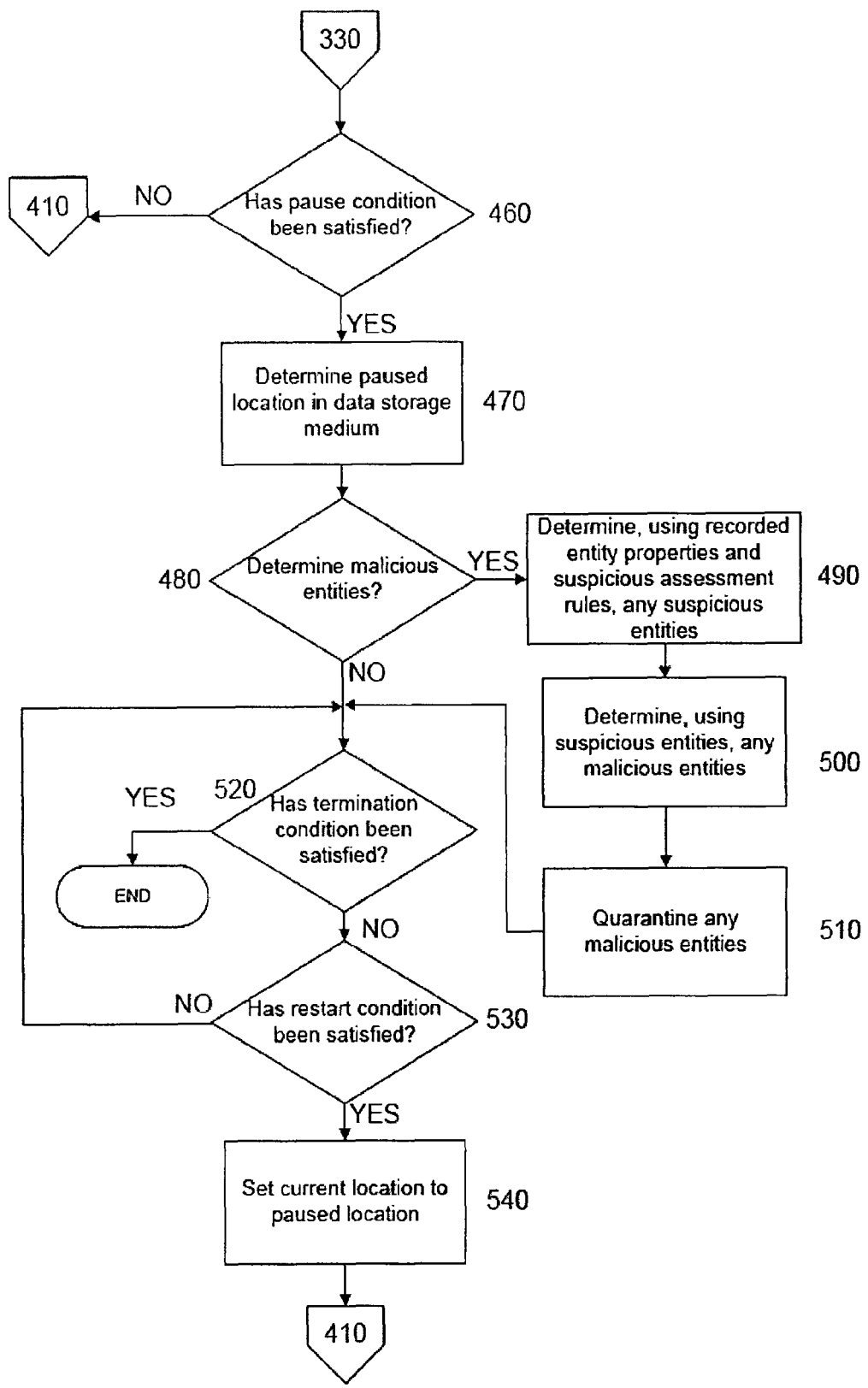

Another more detailed example of a method illustrated in FIG. 2 will now be described with reference to FIGS. 4A and 4B.

In particular, at step 400, the method comprises determining whether at least part of the processing system has entered the range of operating usage. In particular embodiments, the operating usage of the processing system may be the processor (CPU) usage. For example the number of processing cycles being performed. In other particular embodiments, the operating usage of the processing system may be memory (RAM or other data storage) usage. For example the amount of memory being used. The range may be expressed in terms of a percentage, for example 0-10% of the maximum processing capability. Alternatively, the range may be expressed in units, for example 0-1000 MB. In a particular form, the range of operating usage is when the processing system is idle.

In particular embodiments, the range of operating usage can be selectable by the user. In other embodiments, the range of operating usage can be predetermined or pre-configured.

If a positive determination results from step 400, the method continues to step 310. If a negative determination results from step 410, the method continues to monitor the operating usage of the processing system.

At step 410, the method comprises determining if entity properties have previously been recorded for an entity at a location (herein referred to as the current location) in the data storage. In response to a positive determination, the method continues to step 430. In response to a negative determination, the method continues to step 420.

At step 420, the method comprises determining one or more entity properties of the entity at the current location in the data storage medium. The current location in the data storage medium could be a location in a file/entity structure in the data storage medium. Alternatively, the current location could be an address in the data storage medium. Generally when the method is initially performed, the current location in the data storage medium is set to a starting location in the data storage medium.

As determining the entity properties of one or more entities in a data storage medium can be a resource intensive task, it is significantly advantageous to perform step 420 whilst the processing system is in the range of operating usage such that the processing system's resources can be fully utilised in periods of preferable low operating usage.

The entity properties which can be determined comprise at least one of an entity location in processing system, an entity size, an entity type, a cryptographic hash of at least some of an entity, a checksum of at least some of an entity, plaintext of at least a portion of an entity, ciphertext of at least a portion of an entity, timestamps of when an entity was created or modified, and network location where the entity was obtained. In one form, the entity properties are stored in a database.

At step 430, the method comprises determining if at least one entity property of the entities in the data storage medium requires updating. This may comprise determining if the size of the entity has changed since entity properties were last recorded for the entity. Additionally or alternatively, start and end bytes of the entity may be compared to the start and end bytes that were recorded when the entity was last inspected. If a change has occurred, then one or more entity properties for the entity are required to be updated. In response to a positive determination at step 430, the method continues to step 440. In response to a negative determination at step 430, the method continues to step 450.

At step 440, the method comprises updating the one or more entity properties which need to be updated. This step is performed similarly to step 420 except only the entity properties for the entities determined in step 430 are updated. This allows for an efficient recordal of entity properties which have changed from the last determination, thus reducing re-processing performed by the processing system.

At step 450, the method comprises incrementing the current location in the data storage medium to a different entity. For example, the current location may be incremented to an entity next in the entity/file structure of the data storage medium, or alternatively the current location may be incremented to a different address in data storage medium.

At step 460, the method comprises determining whether a pause condition has been satisfied. In one particular form, the pause condition is satisfied when the processing system exits the selected range of operating usage. In response to a negative determination, the method returns to step 410, wherein one or more entity properties for the different entity are determined. In response to a positive determination the method comprises pausing the determination of entity properties at the current location in the data storage medium (as depicted by FIGS. 3A and 3B where the flow control in the flow diagram exist the loop).

At step 470, the method comprises determining a paused location indicative of current location in the data storage medium when the paused condition was satisfied. The paused location may be stored by the processing system in memory or a data store. At this stage the determination of entity properties and whether malicious entities exist in the data storage medium is suspended.

At step 480, the method comprises determining whether a scan of the processing system needs to be performed to determine whether one or more malicious entities exist. This step may comprise a user manually selecting that a scan needs to be performed. Additionally or alternatively, the processing system may be configured to perform a scheduled scan at a particular time. Additionally or alternatively, the processing system may be configured to perform the determination of malicious entities when the processing system is within the operating range. In response to a positive determination that a scan is to be performed, the method continues to step 490.

At step 490, the method comprises determining, using the recorded entity properties and one or more suspicious assessment rules, if one or more suspicious entities exists in the processing system. The suspicious assessment rules determine, using the entity properties, if one or more entities can be considered suspicious.

Generally, if more than one suspicious assessment rules is used, at least some of the rules can be assigned a value, such that when one of the suspicious assessment rules are satisfied, the value is recorded for that particular entity. For each suspicious assessment rule satisfied, each value is totaled together for that entity. If the value is above a maximum threshold value, the entity is identified as being a suspicious entity. Each suspicious assessment rule may additionally or alternatively be weighted according to the effectiveness of the rule's assessment in determining suspicious entities. A more detailed explanation of applying a set of suspicious assessment rules in determining a suspicious/malicious entity is described in the Applicant's co-pending application U.S. Ser. No. 11/707,425 entitled "Determination of related entities", the content of which is herein incorporated by cross-reference.

At step 500, the method optionally comprises performing a scan of the identified suspicious entities to determine whether any of the identified suspicious entities are considered malicious. This may comprise comparing the suspicious entities against a whitelist and/or blacklist to determine which suspicious entities are considered malicious entities. As performing a comparison of all the entities in the data storage medium against a whitelist and/or blacklist is highly resource intensive, the application of the suspicious assessment rules and the recorded entity properties ensures that a reduced number of entities are compared to the whitelist and/or blacklist. Thus, the determination of malicious entities is performed more efficiently. In an alternative embodiment, the suspicious entities are provided as input to a malware scanning software known in the art, wherein a more detailed analysis can be performed to determine whether one or more of the suspicious entities are malicious entities.

At step 510, the method comprises quarantining the one or more malicious entities in the data storage medium. Quarantining the one or more malicious entities may comprise removing, from the data storage medium, the malicious entity. In other forms, quarantining of the malicious entity comprises modifying, in the data storage medium, the malicious entity such that the modification causes the entity to be non-malicious to the processing system.

At step 520, the method comprises determining if a termination condition has been satisfied. This may comprise determining if the user has terminated software performing the method herein before described. In response to a positive determination, the method ends. In response to a negative determination, the method continues to step 530.

At step 530, the method comprises determining whether a restart condition has been satisfied. In particular forms, the restart condition is satisfied when the processing system is in the range of operating usage. In response to a negative determination, the method continues to monitor whether the termination or restart condition has been satisfied. In response to a positive determination, the method continues to step 540.

At step 540, the method comprises setting the current location to the paused location. This can comprise retrieving the paused value from memory which was stored in 470. The method then returns to step 310, where the method comprises restarting the determination of entity properties at the current location which has been set to the paused location in the data storage medium. By restarting the determination at the paused location in the data storage medium, entities which have already had entity properties determined are not redetermined. By restarting at paused location, the method and system is highly efficient at continuing to determine if determine entity properties of entities in the data storage medium of the processing system, and determining if one or more entities are malicious using the determined entity properties.

In an optional embodiment, the method comprises selecting the range of operating usage. This may comprise providing a user an interface, such as a graphical interface, which a user can use to select or provide extremities of the operating usage range.

In another variation, the step of determining whether one or entities are malicious does not necessarily need to be performed while the processing system is outside the range of operating usage. The processing system may be configured to determine if one or more entities are malicious whilst the processing is in the range of operating usage, such as when the processing system is idle.

Optionally, the method may comprise simultaneously determining whether a first entity is suspicious/malicious whilst recording one or more entity properties for a second entity.

In another variation, a number of entities may be analysed to determine the one or more entity properties prior to performing the step of determining whether one or more entities are suspicious/malicious using the one or more entity properties.

In another form, instead of quarantining the one or more malicious entities, the method may alternatively comprise providing an alert indicating that one or more malicious entities have been found in the data storage medium. For example, the alert may be a window displayed on the computer screen indicating the malicious entity. The user may be able to provide input data indicative of whether the malicious entity should be quarantined.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

We claim:

1. A computer-implemented method of determining if one or more entities in a data storage medium of a processing system are malicious, wherein the method comprises:
   determining, by a processor, a level of available operating usage of at least one part of a processing system;
   determining, by the processor, whether the level of available operating usage of the at least one part of the processing system falls within a predetermined range of operating usage;
   scanning one or more entities in the data storage medium when the level of available operating usage of the at least one part of the processing system falls within the predetermined range of operating usage, wherein the one or more entities are scanned to determine properties of the one or more entities;
   suspending the scan of the one or more entities at a first location in the data storage medium when the level of available operating usage exits the predetermined range of operating usage;
   storing data indicating the first location in memory; and
   resuming the scan of the one or more entities at the first location in the data storage medium when the level of available operating usage re-enters the predetermined range of operating usage.

2. The method according to claim 1, wherein the range of operating usage is at least one of:
   processing usage; and,
   memory usage.

3. The method according to claim 1, wherein the entity properties comprises at least one of:
   (i) entity location in processing system;
   (ii) entity size;
   (iii) entity type;
   (x) cryptographic hashes of at least some of an entity;
   (xi) checksums of at least some of an entity;
   (xii) plaintext of at least a portion of an entity;
   (xiii) ciphertext of at least a portion of an entity;
   (xiv) timestamps of when an entity was created or modified; and
   (xv) network location where the entity was obtained.

4. The method according to claim 1, wherein the method comprises quarantining the one or more entities comprising at least one of:
   removing, from the data storage medium, the one or more entities which have been determined as malicious; and
   modifying, in the data storage medium, the one or more entities which have been determined as malicious.

5. The method according to claim 1, wherein the step of determining entity properties of the one or more entities is performed when the processing system is idle.

6. The method according to claim 1, wherein the method comprises:
   using a set of suspicious assessment rules and the recorded entity properties to determine if one or more suspicious entities exist in the data storage medium; and
   if one or more suspicious entities are identified, determining if one or more suspicious entities are malicious to the processing system.

7. A system for determining if one or more entities in a data storage medium of a processing system are malicious, wherein the system comprises:
   a processor;
   memory in electronic communication with the processor;
   the processor configured to:
      determine, by a processor, a level of available operating usage of at least one part of a processing system;
      determine, by the processor, whether the level of available operating usage of the at least one part of the processing system falls within a predetermined range of operating usage;
      scan one or more entities in the data storage medium when the level of available operating usage of the at least one part of the processing system falls within the predetermined range of operating usage,
         wherein the one or more entities are scanned to determine properties of the one or more entities;
      suspend the scan of the one or more entities at a first location in the data storage medium when the level of available operating usage exits the predetermined range of operating usage;
      store data indicating the first location in memory; and
      resume the scan of the one or more entities at the first location in the data storage medium when the level of available operating usage re-enters the predetermined range of operating usage.

8. The system according to claim 7, wherein the range of operating usage is at least one of:
   processing usage; and,
   memory usage.

9. The system according to claim 7, wherein the entity properties comprises at least one of:
   (i) entity location in processing system;
   (ii) entity size;
   (iii) entity type;
   (xvi) cryptographic hashes of at least some of an entity;
   (xvii) checksums of at least some of an entity;
   (xviii) plaintext of at least a portion an entity;
   (xix) ciphertext of at least a portion of an entity;
   (xx) timestamps of when an entity was created or modified; and
   (xxi) network location where the entity was obtained.

10. The system according to claim 7, wherein the step of determining entity properties of the one or more entities is performed when the processing system is idle.

11. The system according to claim 7, wherein the method comprises:

using a set of suspicious assessment rules and the recorded entity properties to determine if one or more suspicious entities exist in the data storage medium; and if one or more suspicious entities are identified, determining if one or more suspicious entities are malicious to the processing system.

12. A computer program product for determining if one or more entities in a data storage medium of a processing system are malicious, the computer program product comprising a non-transitory computer-readable medium having instructions thereon, the instructions comprising:

code programmed to determine, by a processor, a level of available operating usage of at least one part of a processing system;

code programmed to determine, by the processor, whether the level of available operating usage of the at least one part of the processing system falls within a predetermined range of operating usage;

code programmed to scan one or more entities in the data storage medium when the level of available operating usage of the at least one part of the processing system falls within the predetermined range of operating usage, wherein the one or more entities are scanned to determine properties of the one or more entities;

code programmed to suspend the scan of the one or more entities at a first location in the data storage medium when the level of available operating usage exits the predetermined range of operating usage;

code programmed to store data indicating the first location in memory; and code programmed to resume the scan of the one or more entities at the first location in the data storage medium when the level of available operating usage re-enters the predetermined range of operating usage.

* * * * *